(12) United States Patent
Kim et al.

(10) Patent No.: US 10,210,373 B2
(45) Date of Patent: Feb. 19, 2019

(54) FINGERPRINT RECOGNITION SENSOR CAPABLE OF SENSING FINGERPRINT USING OPTICAL AND CAPACITIVE METHOD

(71) Applicant: SILICON DISPLAY TECHNOLOGY, Yongin-si, Gyeonggi-do (KR)

(72) Inventors: Ki Joong Kim, Suwon-si (KR); Ji Ho Hur, Yongin-si (KR); Bong Yeob Hong, Hwaseong-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 2 days.

(21) Appl. No.: 14/904,932

(22) PCT Filed: Oct. 31, 2013

(86) PCT No.: PCT/KR2013/009799
§ 371 (c)(1),
(2) Date: Jan. 13, 2016

(87) PCT Pub. No.: WO2015/008902
PCT Pub. Date: Jan. 22, 2015

(65) Prior Publication Data
US 2016/0148036 A1    May 26, 2016

(30) Foreign Application Priority Data
Jul. 17, 2013 (KR) .................. 10-2013-0084088

(51) Int. Cl.
*G06K 9/00* (2006.01)
(52) U.S. Cl.
CPC ......... *G06K 9/0002* (2013.01); *G06K 9/0004* (2013.01); *G06K 9/00046* (2013.01)

(58) Field of Classification Search
None
See application file for complete search history.

(56) References Cited

U.S. PATENT DOCUMENTS

| | | | |
|---|---|---|---|
| 2003/0090650 A1* | 5/2003 | Fujieda | G06K 9/0004 356/71 |
| 2007/0024546 A1 | 2/2007 | Jang et al. | |
| 2008/0187189 A1* | 8/2008 | Shin | G06K 9/00046 382/124 |

FOREIGN PATENT DOCUMENTS

| | | |
|---|---|---|
| CN | 1215442 | 8/2005 |
| CN | 101467442 | 6/2009 |

(Continued)

OTHER PUBLICATIONS

International Search Report dated Feb. 11, 2014 issued in Application No. PCT/KR2013/009799 (Full English Text).

*Primary Examiner* — Fred Hu
(74) *Attorney, Agent, or Firm* — Lex IP Meister, PLLC

(57) ABSTRACT

Provided is a fingerprint recognition sensor capable of sensing a fingerprint using optical and capacitive methods, the sensor including: a capacitive fingerprint sensing unit that includes a transistor (T2) in which a flowing current is changed depending on an output voltage of a fingerprint sensing electrode capable of sensing the humans fingerprint; and an optical fingerprint sensing unit which changes the flowing current in the transistor (T2) due to a difference in reverse current of a photodiode generated by light and shade depending on existence or non-existence of the fingerprint.

11 Claims, 12 Drawing Sheets

(56) References Cited

FOREIGN PATENT DOCUMENTS

| | | |
|---|---|---|
| CN | 101467443 | 6/2009 |
| JP | 2012-168662 A | 9/2012 |
| KR | 10-2003-0054931 A | 7/2003 |
| KR | 10-2003-0076184 A | 9/2003 |
| KR | 10-2008-0073054 A | 8/2008 |
| KR | 10-0928301 B1 | 11/2009 |

* cited by examiner

[Fig. 1]
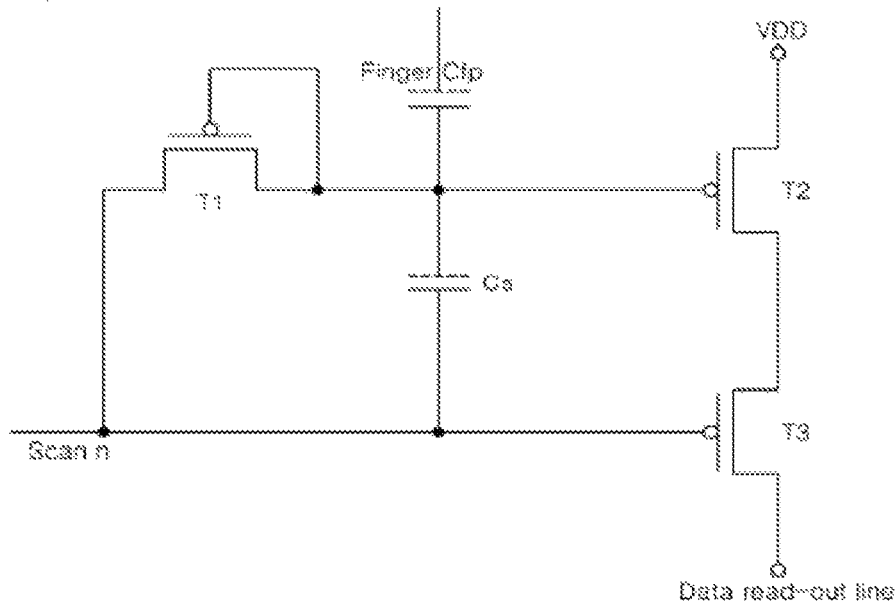
[Fig. 2]
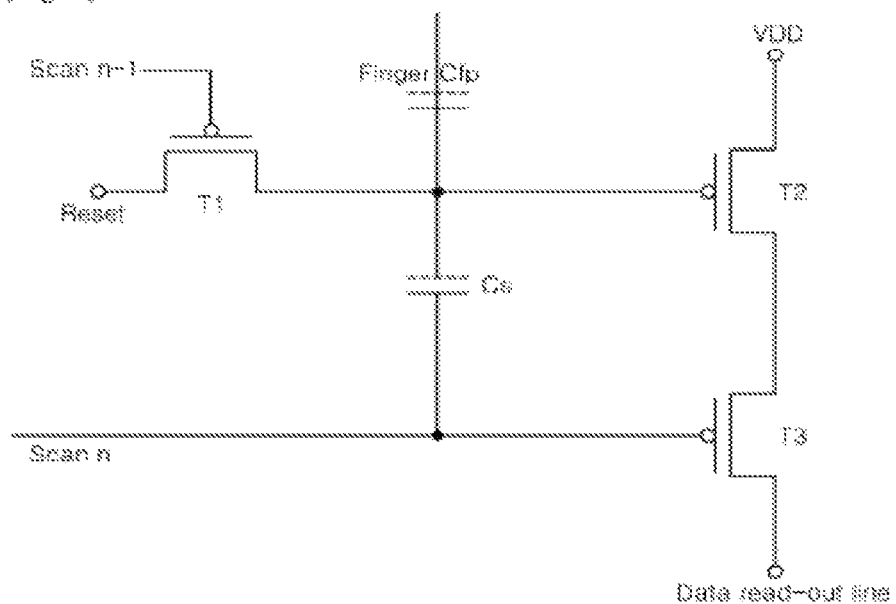

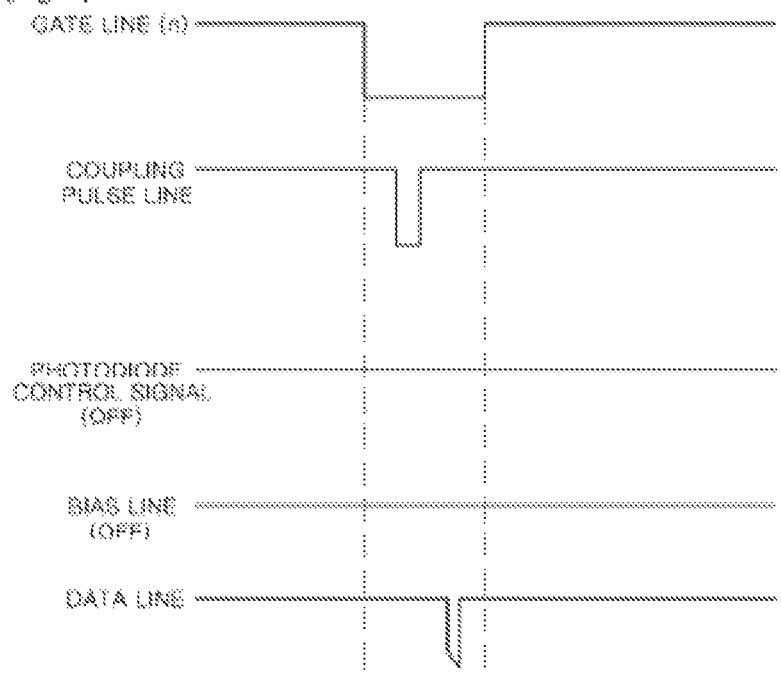
[Fig. 5]
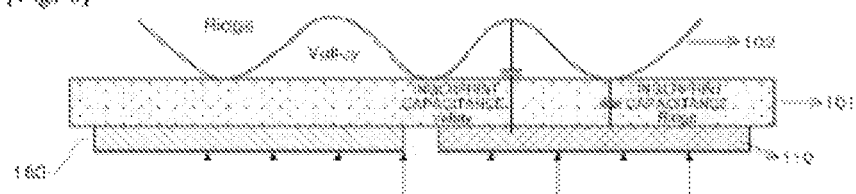
[Fig. 6]
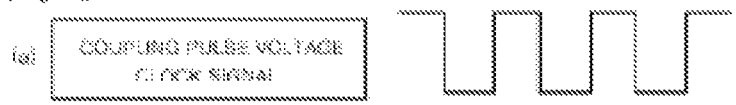
[Fig. 7]
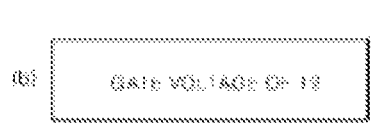
 

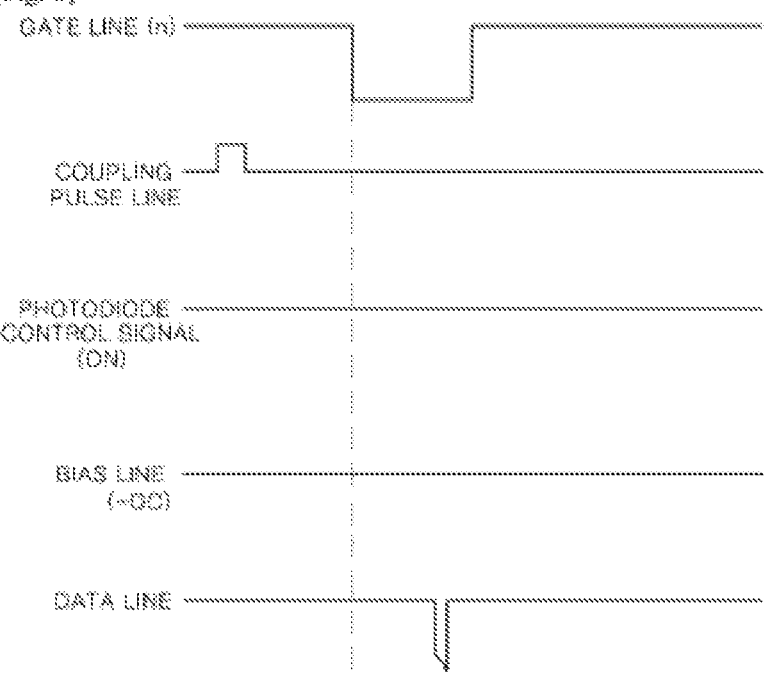
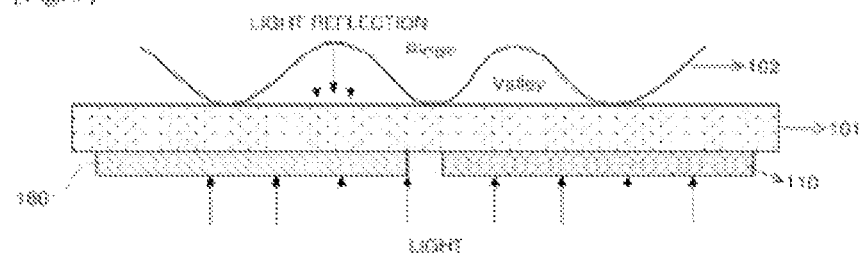

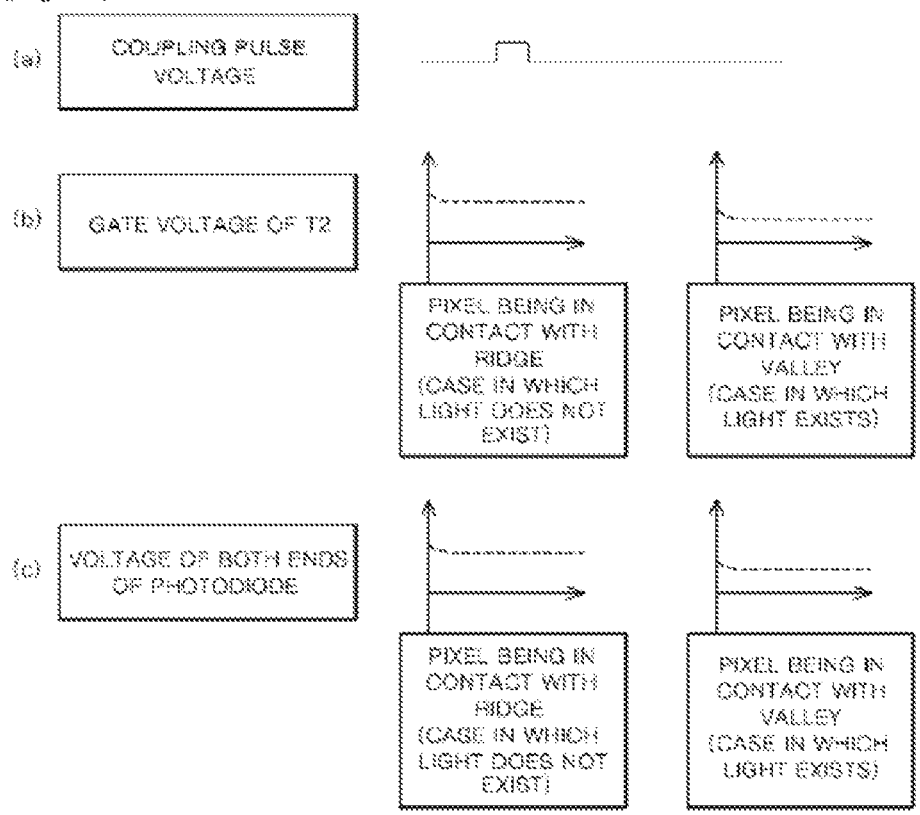

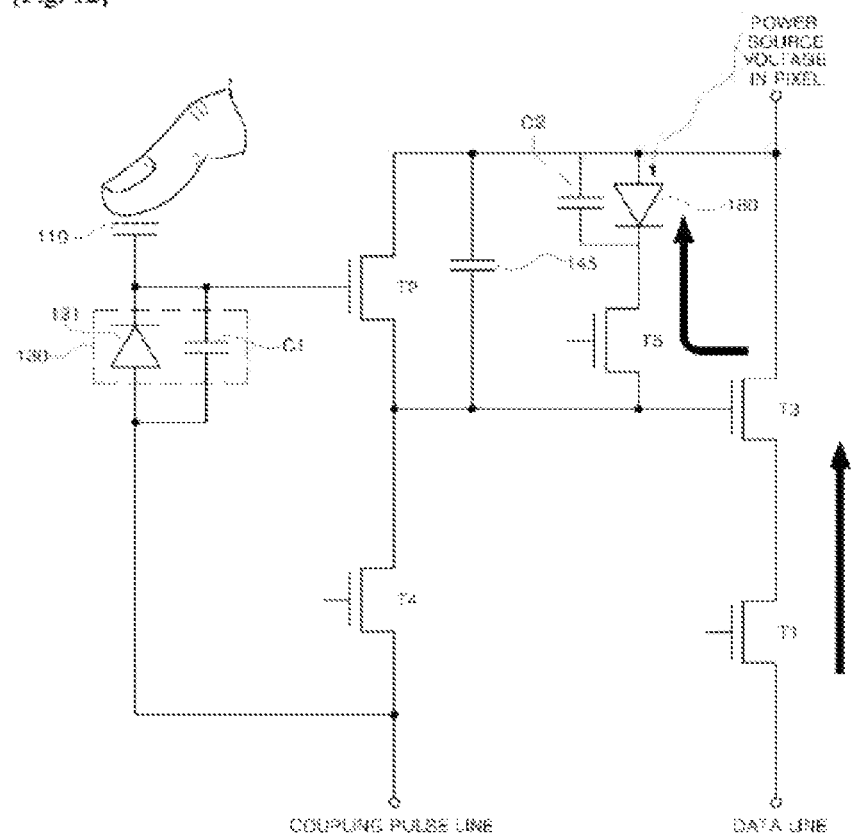
[Fig. 12]

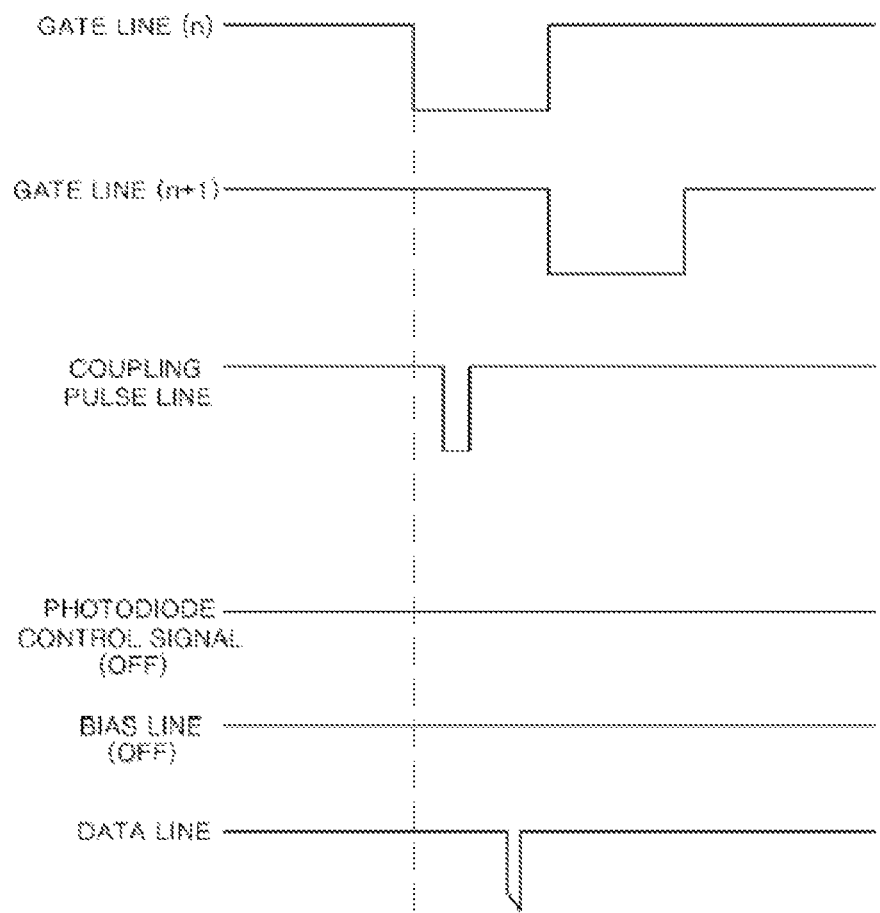
[Fig. 13]
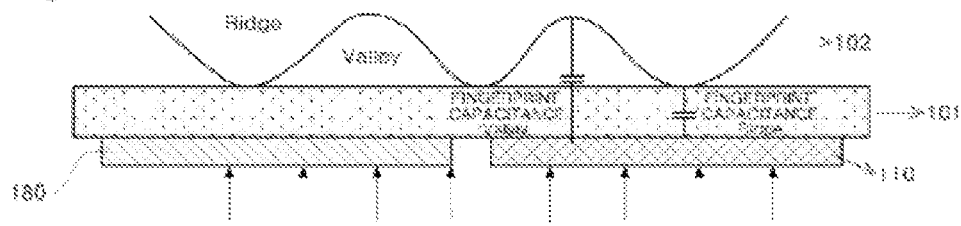
[Fig. 14]

[Fig. 15]
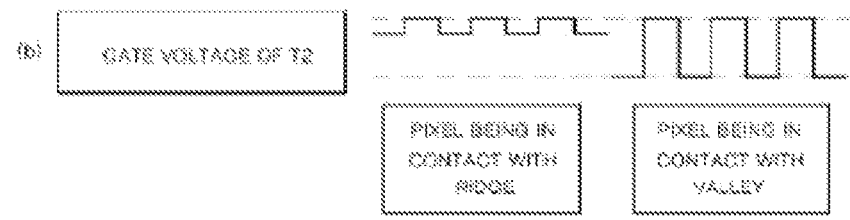
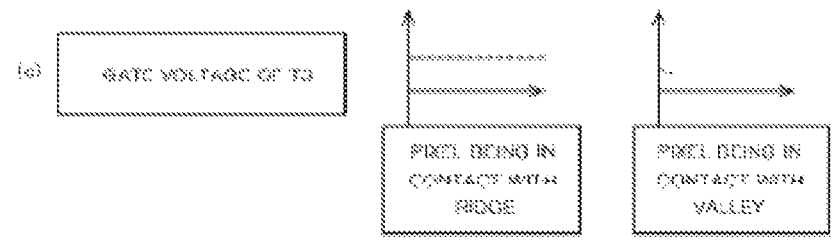
[Fig. 16]
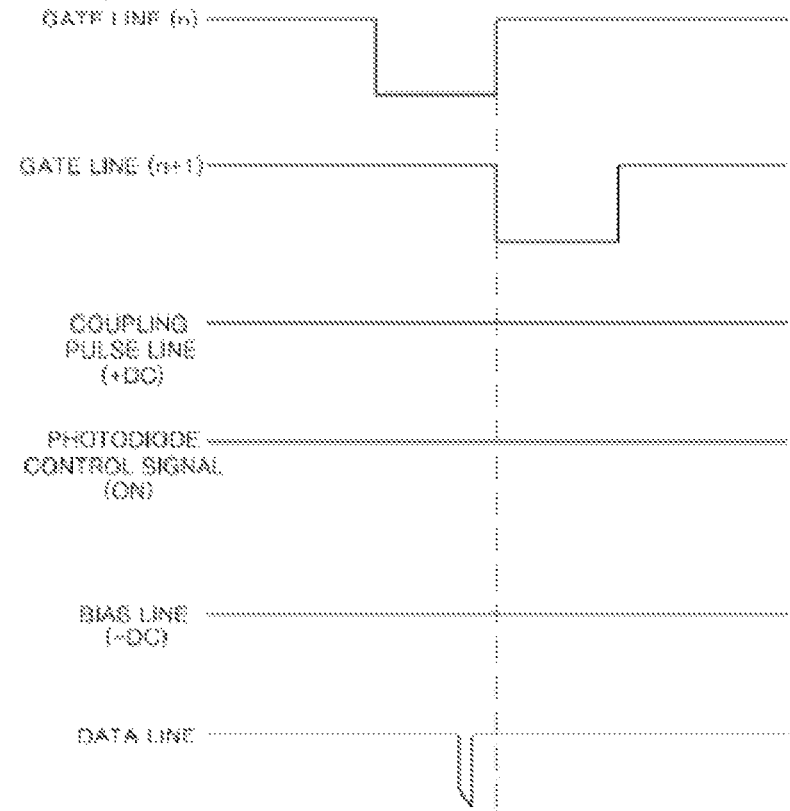

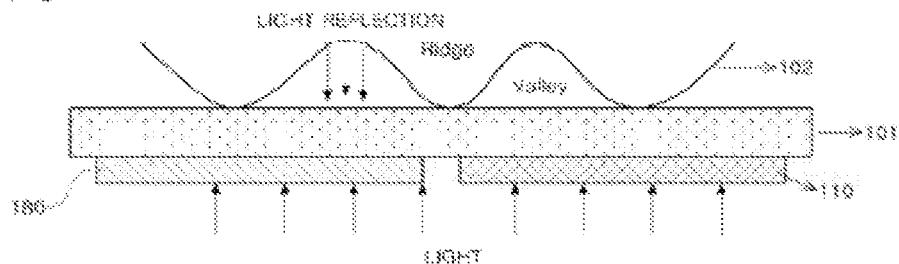
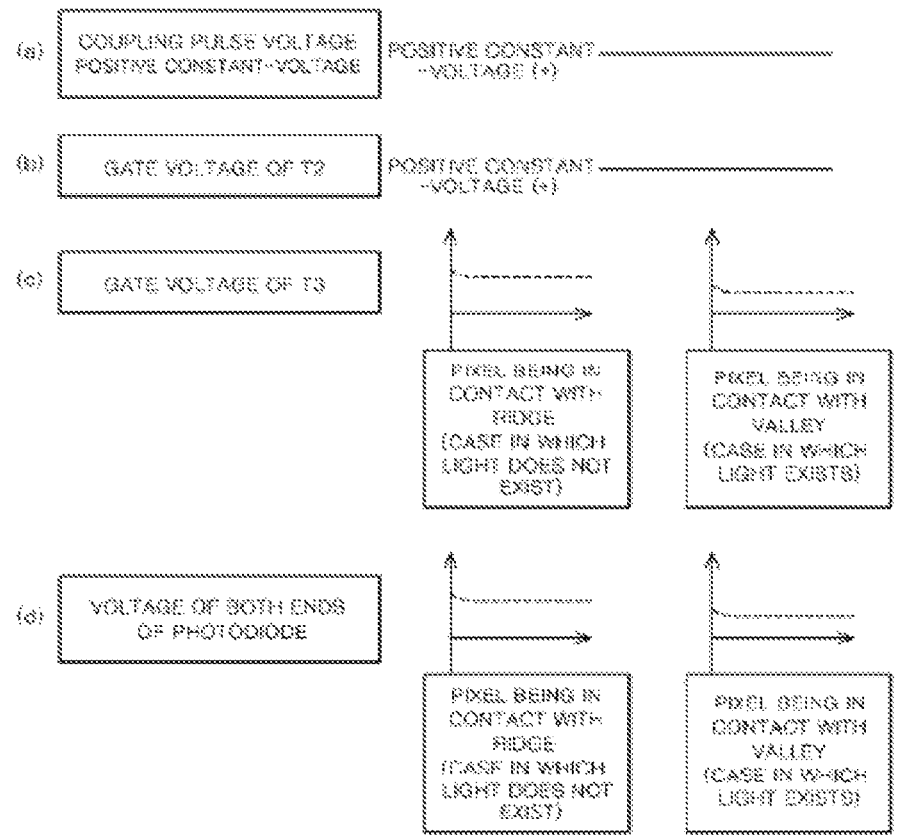

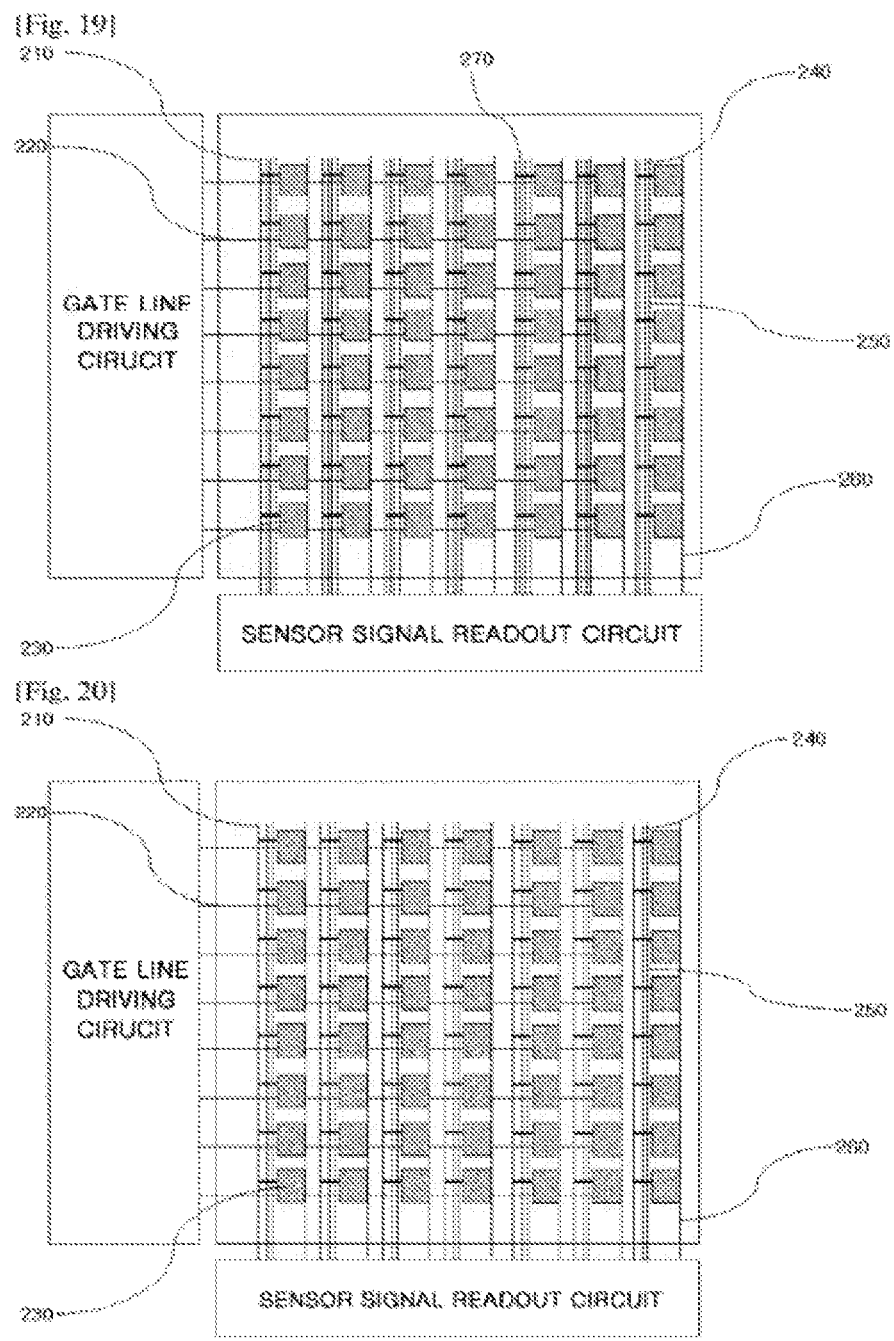

FINGERPRINT RECOGNITION SENSOR CAPABLE OF SENSING FINGERPRINT USING OPTICAL AND CAPACITIVE METHOD

CROSS-REFERENCE TO RELATED PATENT APPLICATIONS

This application is a U.S. National Stage Application under 35 U.S.C. § 371 of PCT Application No. PCT/KR2013/009799, filed Oct. 31, 2013, which claims priority to Korean Patent Application No. 10-2013-0084088, filed Jul. 17, 2013, whose entire disclosures are hereby incorporated by reference.

TECHNICAL FIELD

The present invention relates to a fingerprint recognition sensor, and more specifically, to a fingerprint recognition sensor capable of sensing a humans fingerprint using optical and capacitive methods.

BACKGROUND ART

FIG. 1 and FIG. 2 are circuit diagrams of a capacitive fingerprint sensor using a thin film transistor according to a conventional art.

As illustrated in FIG. 1 and FIG. 2, in the capacitive fingerprint sensor using the thin film transistor according to the conventional art, since a source follower is included within a pixel by using an active pixel structure, an analog-to-digital converter (ADC) recognizes a variation in capacitance depending on a fingerprint as a variation in voltage by data read-out, thereby enabling the sensor to drive without a preamplifier. A reset may be performed using a VDD voltage in a pixel.

The conventional capacitive fingerprint sensor uses a scanning signal or a method in which different voltages from each other are applied to a gate of T2 during one frame at a time depending on the fingerprint by applying a pulse voltage $V_{pulse}$ which enables separate capacitive coupling to be performed, thereby enabling different currents from each other to flow. At this time, when a capacitance by a fingerprint is $C_{fp}$, and the pulse voltage is $\Delta V_{pulse}$, the voltage applied to the gate may be represented by Math Formula 1 as follow.

$$\Delta V_{g\text{-}T2} = \frac{C_s + C_{para\text{-}T1}}{C_s + C_{para\text{-}T1} + C_{para\text{-}T2} + C_{fp}} \times \Delta V_{pulse} \qquad [\text{Math Formula 1}]$$

Here, $\Delta V_{g\text{-}T2}$ is the voltage applied to the gate of T2, and a value thereof is changed depending on the capacitance $C_{fp}$ generated by the fingerprint.

As reviewed above, in the fingerprint sensor according to the conventional art, only the capacitive method using the capacitance generated by the fingerprint is mainly used, but the configuration of the fingerprint sensor capable of sensing the fingerprint using various methods is not provided.

DISCLOSURE OF INVENTION

Technical Problem

Accordingly, the present invention has been made keeping in mind the above problems occurring in the related art.

An aspect of the present invention provides a fingerprint recognition sensor capable of sensing a humans fingerprint using optical and capacitive methods, which is intended to provide appropriate and various fingerprint recognition environments depending on fingerprint recognition conditions.

Solution to Problem

According to an aspect of one exemplary embodiment of the present invention, there is provided a fingerprint recognition sensor capable of sensing a fingerprint using optical and capacitive methods, the fingerprint recognition sensor including: a capacitive fingerprint sensing unit that includes a transistor T2 in which a flowing current is changed depending on an output voltage of a fingerprint sensing electrode detecting a humans fingerprint; and an optical fingerprint sensing unit which changes the current flowing into the transistor T2 due to a difference in reverse current of a photodiode generated by light and shade depending on existence or non-existence of the fingerprint.

According to an aspect of another exemplary embodiment of the present invention, the capacitive fingerprint sensing unit may include: a fingerprint sensing electrode detecting the humans fingerprint; a first transistor T1 which is configured such that a voltage of a gate signal is applied to a gate electrode, and a source electrode is connected to a data line; and a diode transistor which is configured such that a gate electrode and a drain electrode are connected to the fingerprint sensing electrode, and an output signal is applied to a source electrode, wherein the transistor T2 is configured such that a gate electrode is connected to the fingerprint sensing electrode, and the gate electrode and the drain electrode of the diode transistor, a source electrode is connected to a drain electrode of the first transistor T1, and a drain electrode is connected to a power voltage in a pixel or a bias line, and wherein the diode transistor is configured to include a diode and a coupling capacitor C1, the coupling capacitor C1 being connected to an anode electrode and a cathode electrode of the diode.

According to an aspect of still another exemplary embodiment of the present invention, the optical fingerprint sensing unit may include: a photodiode which is configured such that an anode electrode is connected to a power source voltage in a pixel or a bias line; a fifth transistor T5 which is configured such that a control signal of the photodiode is applied to a gate electrode, a source electrode is connected to the gate electrode of the transistor, and a drain electrode is connected to the cathode electrode of the photodiode; and a photodiode capacitor C2 which is connected to the anode electrode and the cathode electrode of the photodiode.

According to an aspect of still another exemplary embodiment of the present invention, the capacitive fingerprint sensing unit may include: a fingerprint sensing electrode detecting a humans fingerprint; a first transistor T1 which is configured such that a gate signal voltage is applied to a gate electrode, and a source electrode is connected to a data line; and a diode transistor which is configured such that a gate electrode and a drain electrode are connected to the fingerprint sensing electrode, and an output signal is applied to a source electrode, wherein the transistor T2 is configured such that a gate electrode is connected to the fingerprint sensing electrode, and the gate electrode and the drain electrode of the diode transistor, and a drain electrode is connected to a power source voltage in a pixel, wherein the diode transistor is configured to include a diode and a coupling capacitor C1, the coupling capacitor C1 being connected to the anode electrode and the cathode electrode of the diode, and the capacitive fingerprint sensing unit may further include: a third transistor T3 which is configured such that a gate electrode is connected to a source electrode of the second transistor T2, a source electrode is connected to the drain electrode of the first transistor T1, and a drain electrode is connected to the power source voltage in the pixel; and a fourth transistor T4 which is configured such that a gate signal voltage is applied to a gate electrode, an input signal is applied to a source electrode, and the source electrode of the second transistor T2 and the gate electrode of the third transistor T3 are connected to a drain electrode.

According to an aspect of still further another exemplary embodiment of the present invention, the optical fingerprint sensing unit may include: a photodiode which is configured such that an anode electrode is connected to a power source voltage in a pixel or a bias line; a fifth transistor T5 which is configured such that a control signal of the photodiode is applied to a gate electrode, a source electrode is connected to the gate electrode of the third transistor T3, and a drain electrode is connected to a cathode electrode of the photodiode; and a photodiode capacitor C2 which is connected to the anode electrode and the cathode electrode of the photodiode.

According to an aspect of still further another exemplary embodiment of the present invention, each active layer of the first transistor T1, the second transistor T2, the diode transistor and the fifth transistor T5 may be made of hat an active layer may be made of at least any one of amorphous silicon, polycrystalline silicon and an oxide semiconductor.

According to an aspect of still further another exemplary embodiment of the present invention, the photodiode may be composed of any one of an amorphous silicon photodiode, an organic photo sensor and an organic quantum dot.

Advantageous Effects of Invention

According to the embodiments of the present invention, the fingerprint recognition sensor capable of the humans fingerprint using the optical and capacitive methods is provided so that various fingerprint recognition environments, which are appropriate for fingerprint recognition conditions, can be provided.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 and FIG. 2 are circuit diagrams of a capacitive fingerprint sensor using a thin film transistor according to a conventional art;

FIG. 5 is a view illustrating a timing diagram for the driving of the capacitive method according to the first exemplary embodiment and the second exemplary embodiment;

FIG. 6 and FIG. 7 are views for explaining the capacitive method of the fingerprint recognition sensor of the present invention;

FIG. 8 is a view illustrating a timing diagram for the driving of the optical method according to the first exemplary embodiment and the second exemplary embodiment;

FIG. 9 and FIG. 10 are views for explaining an optical operation method of the fingerprint recognition sensors according to the first exemplary embodiment and the second exemplary embodiment;

FIG. 12 is a circuit diagram of a fingerprint recognition sensor capable of sensing a fingerprint using optical and capacitive methods according to a fourth exemplary embodiment of the present invention;

FIG. 13 is a view illustrating a timing diagram for the driving of the capacitive method according to the third exemplary embodiment and the fourth exemplary embodiment;

FIG. 14 and FIG. 15 are views for explaining the capacitive method of the fingerprint recognition sensor according to the third exemplary embodiment and the fourth exemplary embodiment;

FIG. 16 is a view illustrating a timing diagram for the driving of the optical method according to the third exemplary embodiment and the fourth exemplary embodiment;

FIG. 17 and FIG. 18 are views for explaining an optical operation method of the fingerprint recognition sensor according to the third exemplary embodiment and the fourth exemplary embodiment;

FIG. 19 is a view illustrating a touch panel in which the fingerprint recognition sensor according to the third exemplary embodiment and the fourth exemplary embodiment is provided as an array; and FIG. 20 is a view illustrating a touch panel in which the fingerprint recognition sensor according to the second exemplary embodiment and the fourth exemplary embodiment is provided as an array.

MODE FOR THE INVENTION

Figure 3:
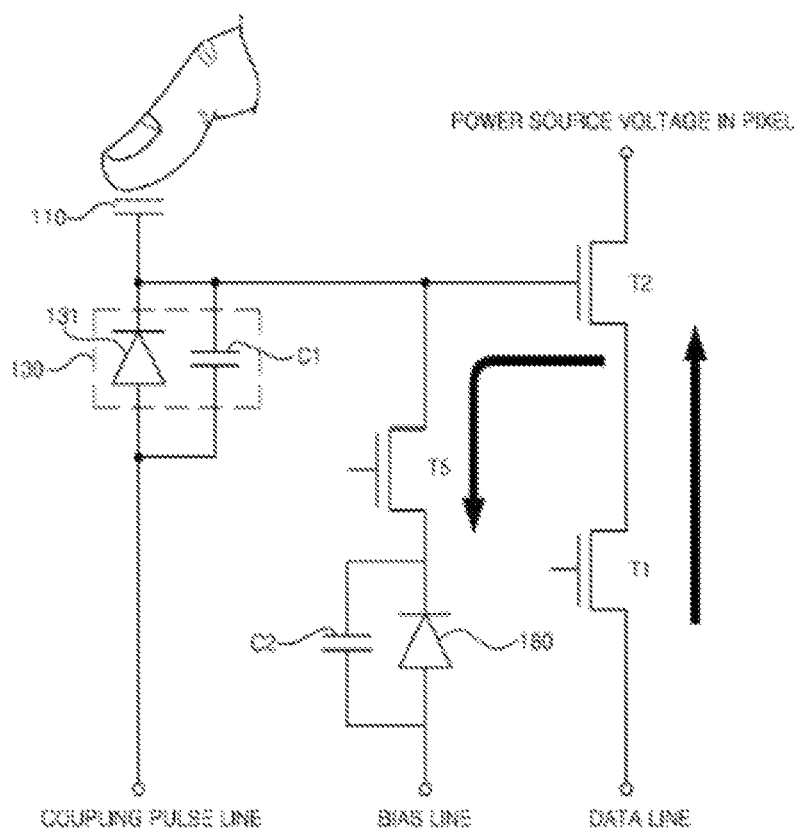
FIG. 3 is a circuit diagram of a fingerprint recognition sensor capable of sensing a fingerprint using optical and capacitive methods according to a first exemplary embodiment of the present invention.

Hereinafter, exemplary embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Further, it should be understood that the shape and size of the elements shown in the drawings may be exaggeratedly drawn to provide an easily understood description of the structure of the present invention rather than reflecting the actual sizes of the corresponding elements.

Figure 4:
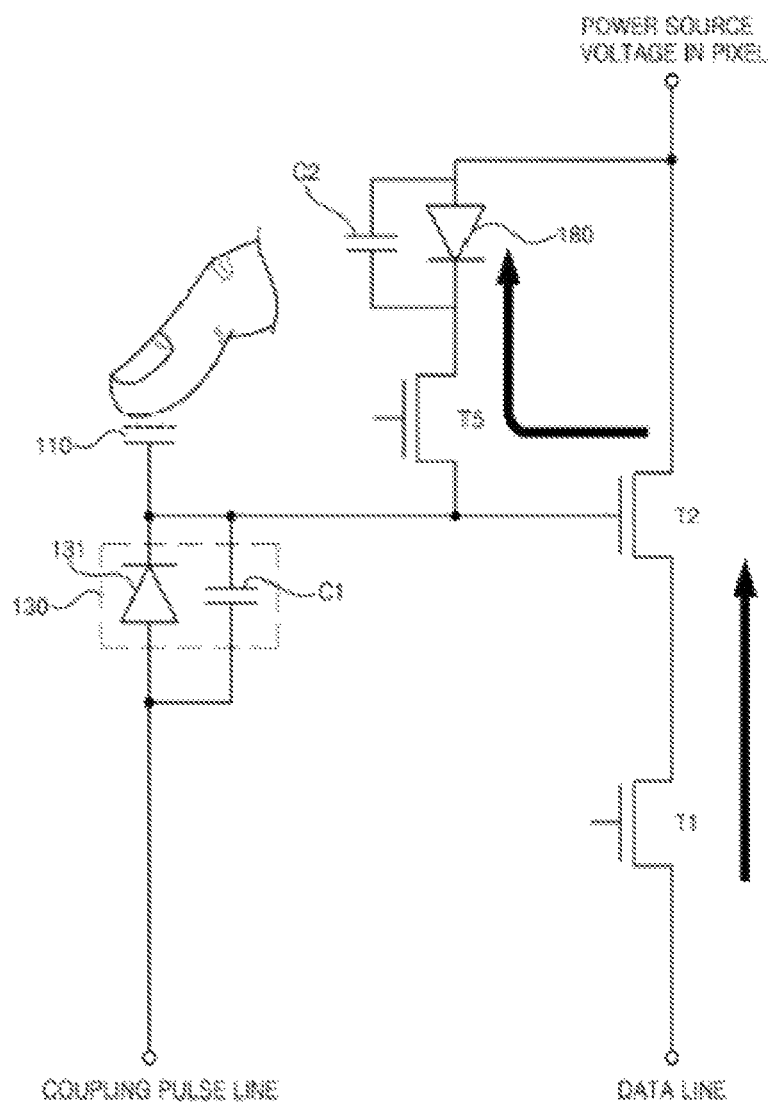
FIG. 4 is a circuit diagram of a fingerprint recognition sensor capable of sensing a fingerprint using optical and capacitive methods according to a second exemplary embodiment of the present invention.

FIG. 3 is a circuit diagram of a fingerprint recognition sensor capable of sensing a fingerprint using optical and capacitive methods according to a first exemplary embodiment of the present invention, and FIG. 4 is a circuit diagram of a fingerprint recognition sensor capable of sensing a fingerprint using optical and capacitive methods according to a second exemplary embodiment of the present invention.

Each of the fingerprint recognition sensors capable of sensing a fingerprint using optical and capacitive methods according to the first exemplary embodiment and the second exemplary embodiment of the present invention is configured to include a capacitive fingerprint sensing unit and an optical fingerprint sensing unit.

The capacitive fingerprint sensing unit is configured to include a second transistor T2 in which a flowing current is changed depending an output voltage of a fingerprint sensing electrode detecting a humans fingerprint, and the optical fingerprint sensing unit changes the current flowing into the second transistor T2 due to a difference in reverse current of the photodiode generated by light and shade resulting from existence or non-existence of the fingerprint.

Reviewing it more specifically, the capacitive fingerprint sensing unit includes: a first transistor T1; a diode transistor 130; and a second transistor T2, and the optical fingerprint sensing unit includes: a fifth transistor T5; and a photodiode 180. The fingerprint sensing electrode 110 detects the humans fingerprint.

The first transistor T1 is configured such that a gate signal voltage is applied to a gate electrode, and a source electrode is connected to a data line.

The diode transistor 130 is configured such that a gate electrode and a drain electrode are connected to the fingerprint sensing electrode 110, and an input signal is applied to a source electrode. At this time, the diode transistor 130 includes a diode 131 and a coupling capacitor C1, and the coupling capacitor C1 is connected to an anode electrode and a cathode electrode of the diode 131.

The second transistor T2 is configured such that a gate electrode is connected to the fingerprint sensing electrode 110, and the gate electrode and the drain electrode of the diode transistor 130.

Also, the second transistor T2 is configured such that a source electrode is connected to a drain electrode of the first transistor T1.

At this time, the second transistor T2 is configured such that a drain electrode is connected to a power source voltage in a pixel.

The photodiode 180 is configured such that an anode electrode is connected to a bias line, and a cathode electrode is connected to a drain electrode of the fifth transistor T5.

At this time, in the first exemplary embodiment of FIG. 3, the photodiode 180 is configured such that an anode electrode is connected to a bias line, and in the second exemplary embodiment of FIG. 4, the photodiode 180 is configured such that an anode electrode is connected to a power source voltage in a pixel.

In the fifth transistor T5, a signal for controlling the photodiode 180 is applied to a gate electrode.

The fifth transistor T5 is configured such that a source electrode is connected to the gate electrode of the second transistor T2, a drain electrode is connected to a cathode electrode of the photodiode 180, and a photodiode capacitor C2 is connected to the anode electrode and the cathode electrode of the photodiode 180. Meanwhile, each active layer of the first transistor T1, the diode transistor 130, the second transistor T2, a third transistor T3, a fourth transistor T4 and the fifth transistor T5 is made of at least one of amorphous silicon, polycrystalline silicon and an oxide semiconductor.

Also, the photodiode 180 is composed of an amorphous silicon photodiode, an organic photo sensor or an organic quantum dot.

FIG. 5 is a view illustrating a timing diagram for the driving of the capacitive method according to the first exemplary embodiment and the second exemplary embodiment, and FIG. 6 and FIG. 7 are views for explaining the capacitive method of the fingerprint recognition sensor of the present invention.

At this time, FIG. 5 is the view illustrating the timing diagram when the transistor is a P-type.

Hereinafter, a driving method of the capacitive method according to the first exemplary and the second exemplary of the present invention will be described with reference to FIG. 5 to FIG. 7.

When a voltage is applied to an $n^{th}$ gate line of the first transistor T1, the first transistor T1 is turned on.

As illustrated in (a) of FIG. 7, when a clock signal in which a high voltage and a low voltage apply are repeated at a certain cycle is applied to a coupling pulse line, the applied coupling pulse voltage is a high voltage, the diode transistor 130 is turned on, thereby enabling a current to flow.

Thus, a gate voltage of the second transistor T2 is set up to a high voltage.

When the coupling pulse voltage is a low voltage, the diode transistor 130 is turned off, so that a floating gate terminal of the second transistor T2 has a low voltage reduced by a capacitive coupling phenomenon.

At this time, the capacitive coupling is determined by the following Math Formula 2.

$$\Delta V_{g\text{-}T2} = \frac{CouplingCapacitance}{CouplingCapacitance + FingerprintCapacitance} \times \Delta V_{pulse} \quad \text{[Math Formula 2]}$$

Here, $\Delta V_{g\text{-}T2}$ represents a variation in voltage of the gate of the second transistor T2 due to the capacitive coupling, and $\Delta V_{pulse}$ represents the applied coupling pulse voltage.

As illustrated in FIG. 6, the photodiode 180 and the fingerprint sensing electrode 110 are each formed on one surface of a protective layer 101, and since a fingerprint 102 has a difference in height according to a ridge and a valley of the fingerprint, this causes a difference in capacitance which enables an electrode to be formed. At this time, the capacitance is called a fingerprint capacitance.

As illustrated in (b) of FIG. 7, according to the ridge and valley of the fingerprint 102, a difference in voltage is generated from the gate of the second transistor T2, and the current flowing from the data line to the second transistor T2 is changed as much as the difference in voltage, so that the fingerprint can be detected.

At this time, when the fingerprint recognition is performed by the capacitive method, although a bias voltage or the power source voltage in the pixel is applied, this does not have an effect on the fingerprint recognition using the capacitive method because the fifth transistor T5 is turned off.

FIG. 8 is a view illustrating a timing diagram for the driving of the optical method according to the first exemplary embodiment and the second exemplary embodiment, and FIG. 9 and FIG. 10 are views for explaining an optical operation method of the fingerprint recognition sensors according to the first exemplary embodiment and the second exemplary embodiment.

At this time, FIG. 8 is the view illustrating the timing diagram when the transistor is a P-type. Hereinafter, the optical driving method according to the first exemplary and the second exemplary of the present invention will be described with reference to FIG. 8 to FIG. 10.

When a coupling voltage pulse having a certain cycle is applied to a first frame, and the coupling voltage pulse applies a positive voltage, a current flows because the diode transistor 130 is turned on, and as a result, the gate voltage of the second transistor T2 is set up to a positive constant-voltage. After this, a voltage is applied to the $n^{th}$ gate line of the first transistor T1, so that the first transistor T1 is turned on.

After this, the fifth transistor T5 is turned on, so that the positive constant-voltage set up in the gate electrode of the second transistor T2 is applied to the cathode electrode of the photodiode 180.

At this time, in the first exemplary embodiment of FIG. 3, due to the bias voltage, a negative constant-voltage is applied to the anode electrode of the photodiode 180, and in the second exemplary embodiment of FIG. 4, due to the power source voltage in the pixel, the negative constant-voltage is applied to the anode electrode of the photodiode 180. Thus, as illustrated in (c) of FIG. 10, a variation in voltage is generated from both ends of the photodiode 180, thereby enabling a reverse current to flow in the photodiode 180. Due to the fingerprint under such a condition, a difference in reverse current of the photodiode is generated according to the existence and non-existence of light on the photodiode, and the gate voltage of the second transistor T2 is changed depending on the difference so that the fingerprint can be detected according to the existence and non-existence of light. At this time, the light is irradiated to the sensor during one frame, and the light irradiated during the one frame is stored in a photodiode capacitor C2 and is then converted into a charge amount. That is, according to a difference in charge amount stored due to the light, the reverse current flowing in the photodiode is changed, so that the gate voltage of the second transistor T2 can be changed depending on the existence or non-existence of light.

That is, as illustrated in (b) of FIG. 10, depending on the existence or non-existence of light as the aforesaid condition, the difference in voltage is generated from the gate of the second transistor, and due to the difference in gate voltage of the second transistor T2, the difference in current flowing into the second transistor T2 is generated, and thus the changed current enables the data line to read out data as a voltage is applied to the $n^{th}$ gate line of the first transistor T1, and thus the first transistor T1 is turned on.

Figure 11:
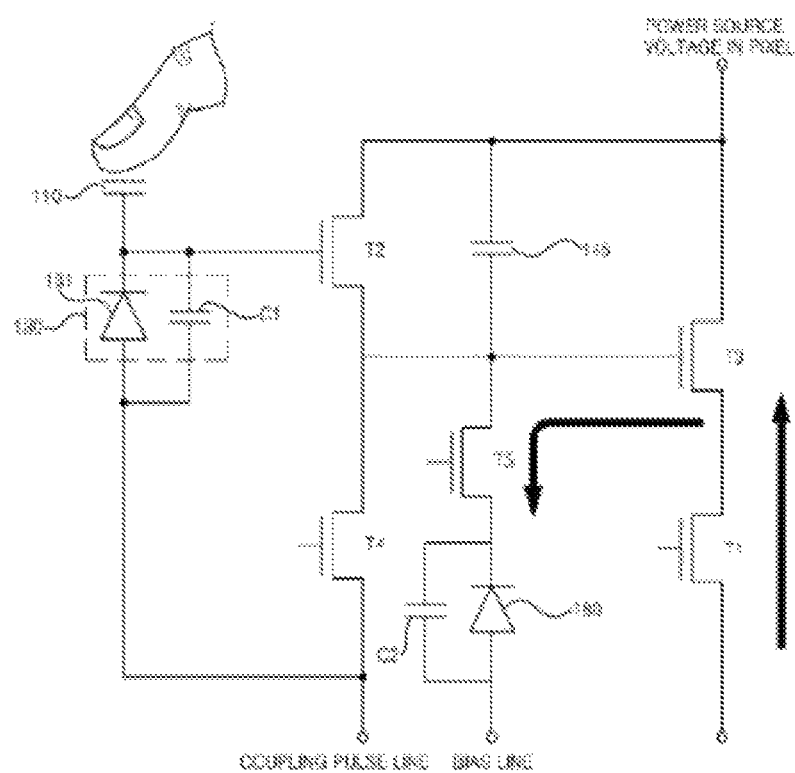
FIG. 11 is a circuit diagram of a fingerprint recognition sensor capable of sensing a fingerprint using optical and capacitive methods according to a third exemplary embodiment of the present invention.

FIG. 11 is a circuit diagram of a fingerprint recognition sensor capable of sensing a fingerprint using optical and capacitive methods according to a third exemplary embodiment of the present invention, and FIG. 12 is a circuit diagram of a fingerprint recognition sensor capable of sensing a fingerprint using optical and capacitive methods according to a fourth exemplary embodiment of the present invention;

Each of the fingerprint recognition sensors capable of sensing a fingerprint using optical and capacitive methods according to the third exemplary embodiment and the fourth exemplary embodiment of the present invention is configured to include a capacitive fingerprint sensing unit and an optical fingerprint sensing unit.

The capacitive fingerprint sensing unit includes the second transistor T2 and the third transistor T3 which are each configured such that a flowing current is changed depending the output voltage of the fingerprint sensing electrode detecting the humans fingerprint, and the optical fingerprint sensing unit changes the flowing current in the third transistor T3 due to the difference in reverse current of the photodiode generated by light and shade resulting from the existence or non-existence of the fingerprint.

Reviewing it more specifically, the capacitive fingerprint sensing unit includes: the fingerprint sensing electrode 110; the first transistor T1; the diode transistor 130; the second transistor T2; the third transistor T3; the fourth transistor T4; and a storage capacitance 145. The optical fingerprint sensing unit includes: the fifth transistor T5; the photodiode 180; and the photodiode capacitor C2 connected to the anode electrode and the cathode electrode of the photodiode 180.

The fingerprint sensing electrode 110 detects the humans fingerprint.

The first transistor T1 is configured such that a gate signal voltage is applied to a gate electrode, and a source electrode is connected to a data line.

The diode transistor 130 is configured such that a gate electrode and a drain electrode are connected to the fingerprint sensing electrode 110, and an input signal is applied to a source electrode. That is, the diode transistor 130 includes the diode 131 and the coupling capacitor C1, and the coupling capacitor C1 is connected to an anode electrode and a cathode electrode of the diode 131.

The second transistor T2 is configured such that a gate electrode is connected to the fingerprint sensing electrode 110, and the gate electrode and the drain electrode of the diode transistor 130.

Also, the second transistor T2 is configured such that a drain electrode is connected to a power source voltage in a pixel.

The third transistor T3 is configured such that a gate electrode is connected to a source electrode of the second transistor T2, a source electrode is connected to a drain electrode of the first transistor T1, and a drain electrode is connected to the power source voltage in the pixel.

The fourth transistor T4 is configured such that a gate signal voltage is applied to a gate electrode, an input signal is applied to a source electrode, and the source electrode of the second transistor T2 and the gate electrode of the third transistor T3 are connected to a drain electrode.

At this time, in the third exemplary embodiment of FIG. 11, the anode electrode of the photodiode 180 is connected to the bias line, and in the fourth exemplary embodiment of FIG. 12, the anode electrode of the photodiode 180 is connected to the power source voltage in the pixel.

The fifth transistor T5 is configured such that a control signal of the photodiode 180 is applied to a gate electrode, a source electrode is connected to the gate electrode of the third transistor T3, and a drain electrode is connected to the cathode electrode of the photodiode 180.

Meanwhile, each active layer of the first transistor T1, the diode transistor 130, the second transistor T2, the third transistor T3, the fourth transistor T4 and the fifth transistor T5 is made of at least one of amorphous silicon, polycrystalline silicon and an oxide semiconductor.

Also, the photodiode 180 is composed of an amorphous silicon photodiode, an organic photo sensor or an organic quantum dot.

FIG. 13 is a view illustrating a timing diagram for the driving of the capacitive methods according to the third exemplary embodiment and the fourth exemplary embodiment, and FIG. 14 and FIG. 15 are views for explaining the capacitive methods of the fingerprint recognition sensors according to the third exemplary embodiment and the fourth exemplary embodiment;

At this time, FIG. 13 is the view illustrating the timing diagram when the transistor is a P-type.

Hereinafter, the capacitive driving method according to the third exemplary and the fourth exemplary of the present invention will be described with reference to FIG. 13 to FIG. 15.

The first transistor T4 is turned on when a voltage is applied to an $n^{th}$ gate line of the fourth transistor T4. As illustrated in (a) of FIG. 15, in a case where a clock signal in which a high voltage and a low voltage apply are repeated at a certain cycle is applied to a coupling pulse line, when the applied coupling pulse voltage is a high voltage, the diode transistor 130 is turned on, thereby enabling a current to flow.

Thus, the gate voltage of the second transistor T2 is set up to a high voltage.

When the coupling pulse voltage is a low voltage, the diode transistor 130 is turned off, so that the floating gate terminal of the second transistor T2 has a low voltage reduced by a capacitive coupling phenomenon.

At this time, the capacitive coupling is determined by Math Formula 2 as described above.

As illustrated in FIG. 14, the photodiode 180 and the fingerprint sensing electrode 110 are each formed on one surface of the protective layer 101, and since the fingerprint 102 has a difference in height according to the ridge and valley thereof, this causes a difference in capacitance which enables an electrode to be formed. At this time, the capacitance is called a fingerprint capacitance.

As illustrated in (b) of FIG. 15, according to the ridge and valley of the fingerprint 102, a difference in voltage is generated at the gate of the second transistor T2.

When the difference in gate voltage of the second transistor T2 is generated, the flowing current is changed, and thus a difference in gate voltage of the third transistor T3 is generated, and as a result, the flowing current into the third transistor T3 is changed, thereby enabling the fingerprint to be detected.

At this time, when the fingerprint recognition is performed by the capacitive method, although the bias voltage or the power source voltage in the pixel is applied, this does not have an effect on the fingerprint recognition using the capacitive method because the fifth transistor T5 is turned off. When a voltage is applied to an n+1$^{th}$ gate line to make a turn on state, the fourth transistor T4 is turned on. When the coupling pulse voltage is a high voltage through the fourth transistor T4, the gate voltage of the third transistor T3 may be reset.

FIG. 16 is a view illustrating a timing diagram for the driving of the optical method according to the third exemplary embodiment and the fourth exemplary embodiment, and FIG. 17 and FIG. 18 are views for explaining an optical operation method of the fingerprint recognition sensors according to the third exemplary embodiment and the fourth exemplary embodiment.

At this time, FIG. 16 is the view illustrating the timing diagram when the transistor is the P-type.

Hereinafter, the optical driving method according to the first exemplary and the second exemplary of the present invention will be described with reference to FIG. 16 to FIG. 18.

Light is irradiated to the sensor during one frame, and after the light is irradiated to the sensor during the one frame, a voltage is applied to the n$^{th}$ gate line to make a turn on state. The light irradiated during the one frame is stored in the photodiode capacitor and is then converted into a charge amount. That is, the reverse current flowing to the photodiode is changed depending on a difference in the stored charge amount due to the light, and thus the gate voltage of the third transistor T3 is changed depending on the existence or non-existence of the light so that the fingerprint can be detected.

As illustrated in (a) of FIG. 18, when a certain amount of positive constant-voltage is applied to the coupling pulse line, the gate voltage of the third transistor T3 is reset to a positive voltage through the fourth transistor T4, and at the same time, the diode transistor 130 is turned on, and thus as illustrated in (b) of FIG. 18, the voltage of the gate electrode of the second transistor T2 is set up to the positive constant-voltage.

Since the voltage of the gate electrode of the second transistor T2 is set up to the positive constant-voltage, the second transistor T2 is turned off.

As the voltage is applied to the n$^{th}$ gate line of the first transistor T1, the first transistor T1 is turned on, and thereafter, the positive constant voltage, which is set up in the gate electrode of the third transistor T3, is applied to the cathode electrode of the photodiode 180 as the fifth transistor T5 is turned on.

At this time, in the third exemplary embodiment of FIG. 11, a negative constant-voltage is applied to the anode electrode of the photodiode 180 due to the bias voltage, and in the fourth exemplary embodiment of FIG. 12, the negative constant voltage is applied to the anode electrode of the photodiode 180 due to the power source voltage in the pixel. Furthermore, as illustrated in (d) of FIG. 18, a change in voltage of both ends of the photodiode 180 is generated, and a reverse current flows in the photodiode 180.

That is, a difference in current of the third transistor T3 is generated due to a difference in gate voltage of the third transistor T3 depending on the existence or non-existence of light due to the fingerprint. As the voltage is applied to the n$^{th}$ gate line to make a turn on state, the changed current enables the data line to read out the data.

With regard to the fingerprint under such a condition, in the photodiode 180, the difference in voltage is generated at the gate of the third transistor T3 as illustrated in (c) of FIG. 10 depending on the existence or non-existence of light, and the current flowing to the third transistor T3 by passing through the data line is changed as much as the difference in voltage, thereby enabling the existence or non-existence of the fingerprint to be detected.

FIG. 19 is a view illustrating a fingerprint recognition sensor panel in which the fingerprint recognition sensor according to the first exemplary embodiment and the third exemplary embodiment is provided as an array, and FIG. 20 is a view illustrating a fingerprint recognition sensor panel in which the fingerprint recognition sensor according to the second exemplary embodiment and the fourth exemplary embodiment is provided as an array.

As illustrated in FIG. 19, a fingerprint recognition sensor 230 capable of sensing a fingerprint using the optical and capacitive methods according to the first and third exemplary embodiments of the present invention is disposed on a touch panel in an array form, and is connected to a data line 210, a gate line 220, a power source voltage 240 in a pixel, a coupling pulse line 250, an EMI line 260 and a bias line 270.

Also, as illustrated in FIG. 20, the fingerprint recognition sensor 230 capable of sensing the fingerprint using the optical and capacitive methods according to the second and fourth exemplary embodiments of the present invention is disposed on a touch panel in an array form, and is connected to the data line 210, the gate line 220, the power source voltage 240 in the pixel, the coupling pulse line 250, and the EMI line 260.

The exemplary embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A fingerprint recognition sensor capable of sensing a fingerprint using optical and capacitive methods, the sensor comprising:
   a capacitive fingerprint sensing unit that comprises a transistor (T2) in which a flowing current is changed depending on an output voltage of a fingerprint sensing electrode capable of sensing a humans fingerprint; and
   an optical fingerprint sensing unit which changes the flowing current in the transistor (T2) due to a difference in reverse current of a photodiode generated by light and shade depending on existence or non-existence of the fingerprint.

2. The fingerprint recognition sensor of claim 1, wherein the capacitive fingerprint sensing unit comprises:
   a fingerprint sensing electrode detecting the humans finger;
   a first transistor (T1) which is configured such that a voltage of a gate signal is applied to a gate electrode, and a source electrode is connected to a data line; and
   a diode transistor which is configured such that a gate electrode and a drain electrode are connected to the fingerprint sensing electrode, and an output signal is applied to a source electrode.

3. The fingerprint recognition sensor of claim 2, wherein the transistor (T2) is configured such that a gate electrode is the fingerprint sensing electrode, and the gate electrode and the drain electrode of the diode transistor, a source electrode is connected to a drain electrode of the first transistor T1, and a drain electrode is connected to a power source voltage in a pixel or a bias line, and
   wherein the diode transistor is configured to comprise a diode and a coupling capacitor C1, the coupling capacitor (C1) being connected to an anode electrode and a cathode electrode of the diode.

4. The fingerprint recognition sensor of claim 3, wherein the optical fingerprint sensing unit comprises:
   a photodiode which is configured such that an anode electrode is connected to a power source voltage in a pixel or a bias line;
   a fifth transistor (T5) which is configured such that a control signal of the photodiode is applied to a gate electrode, a source electrode is connected to the gate electrode of the transistor, and a drain electrode is connected to a cathode electrode of the photodiode; and
   a photodiode capacitor (C2) which is connected to the anode electrode and the cathode electrode of the photodiode.

5. The fingerprint recognition sensor of claim 1, wherein the capacitive fingerprint sensing unit comprises:
   a fingerprint sensing electrode detecting the humans fingerprint;
   a first transistor (T1) which is configured such that a gate signal voltage is applied to a gate electrode, and a source electrode is connected to a data line; and
   a diode transistor which is configured such that a gate electrode and a drain electrode is connected to the fingerprint sensing electrode, and an input signal is applied to a source electrode.

6. The fingerprint recognition sensor of claim 5, wherein the transistor (T2) is configured such that a gate electrode is connected to the fingerprint sensing electrode, and the gate electrode and the drain electrode of the diode transistor, and a drain electrode is connected to a power source voltage in a pixel,
   wherein the diode transistor is configured such that is configured to include a diode and a coupling capacitor C1, the coupling capacitor C1 being connected to the anode electrode and the cathode electrode of the diode, and
   wherein the capacitive fingerprint sensing unit further comprises: a third transistor T3 which is configured such that a gate electrode is connected to the source electrode of the second transistor T2, a source electrode is connected to the drain electrode of the first transistor T1, and a drain electrode is connected to the power source voltage in the pixel; and a fourth transistor T4 which is configured such that a gate signal voltage is applied to a gate electrode, an input signal is applied to a source electrode, and the source electrode of the second transistor T2 and the gate electrode of the third transistor T3 are connected to a drain electrode.

7. The fingerprint recognition sensor of claim 6, wherein the optical fingerprint sensing unit comprises:
   a photodiode which is configured such that an anode electrode is connected to a power source voltage in a pixel or a bias line;
   a fifth transistor T5 which is configured such that a control signal of the photodiode is applied to a gate electrode, a source electrode is connected to the gate electrode of the third transistor T3, and a drain electrode is connected to a cathode electrode of the photodiode; and
   a photodiode capacitor C2 which is connected to the anode electrode and the cathode electrode of the photodiode.

8. The fingerprint recognition sensor of claim 4, wherein each active layer of the first transistor (T1), the transistor (T2), the diode transistor and the fifth transistor (T5) is made of at least one of amorphous silicon, polycrystalline silicon and an oxide semiconductor.

9. The fingerprint recognition sensor of claim 7, wherein each active layer of the first transistor (T1), the transistor (T2), the diode transistor and the fifth transistor (T5) is made of at least one of amorphous silicon, polycrystalline silicon and an oxide semiconductor.

10. The fingerprint recognition sensor of claim 4, wherein the photodiode is composed of any one of an amorphous silicon photodiode, an organic photo sensor and an organic quantum dot.

11. The fingerprint recognition sensor of claim 7, wherein the photodiode is composed of any one of an amorphous silicon photodiode, an organic photo sensor and an organic quantum dot.

* * * * *